United States Patent [19]

Morishita et al.

[11] 4,001,498
[45] Jan. 4, 1977

[54] VIDEO MIXING AND/OR KEYING SYSTEM

[75] Inventors: Masanobu Morishita; Hidehiko Inoue; Takao Ando; Mitsuru Kawasaki, all of Tokyo, Japan

[73] Assignee: Nippon Electric Co., Ltd., Tokyo, Japan

[22] Filed: Aug. 5, 1975

[21] Appl. No.: 602,150

[30] Foreign Application Priority Data

Aug. 7, 1974 Japan .............................. 49-90493

[52] U.S. Cl. .......................... 358/160; 178/DIG. 6; 358/182; 358/183
[51] Int. Cl.² .......................................... H04N 5/22
[58] Field of Search .............. 178/69.5 DC, DIG. 6, 178/6.8; 358/8; 360/36

[56] References Cited

UNITED STATES PATENTS

| | | | |
|---|---|---|---|
| 3,647,965 | 3/1972 | Butler | 178/69.5 DC |
| 3,931,638 | 1/1976 | Lentz | 360/36 |

*Primary Examiner*—Howard W. Britton
*Attorney, Agent, or Firm*—Hopgood, Calimafde, Kalil, Blaustein & Lieberman

[57] ABSTRACT

A system for mixing and/or keying video signals includes a number of video signal processors each of which includes a charge-coupled device as a variable delay element to bring about phase coincidence among a plurality of video signals. The amplitude of the delayed video signal from the charge-coupled device is controlled, and the amplitude-controlled video signals are mixed.

5 Claims, 12 Drawing Figures

VIDEO MIXING AND/OR KEYING SYSTEM

The present invention relates to video mixing/keying systems capable of mixing video signals and/or keying one video signal into part of another video signal. The invention relates more particularly to video mixing-/keying systems capable of automatically bringing the phases of a plurality of video signals into coincidence.

Prior art video mixing/keying systems lack the function of establishing phase coincidence among video signals. This has necessitated the use of an extra automatic phase compensator for the video mixing/keying system, resulting in an increase in the overall system size. Moreover, the required additional phase compensator uses a considerable number of variable capacitors and variable-LC delay lines to achieve delay time control by an external signal, with the result that the system reliability tends to vary with temperature.

Furthermore, the conventional video mixing/keying systems cannot process more than three video signals at a time. For more video signals, an increased number of systems must be used at the sacrifice of increased design complication and additional cost.

It is therefore an object of the invention to provide a video mixing/keying system having the function of bringing the phases of video signals into coincidence.

It is another object of the invention to provide a video mixing/keying system capable of mixing/keying for three or more video signals at a time.

The video mixing/keying system according to the invention employs charge-coupled devices as variable delay elements to bring the phases of a plurality of video signals into coincidence. In a charge-coupled device as an analog delay means, the desired delay is obtained by varying the frequency of a clock pulse for charge transfer drive. The output of a delay line is compared with a reference signal with respect to phase. The frequency of a clock pulse generated by an oscillator is varied by the resultant phase-difference signal to vary the delay time, whereby the phase of a video signal is made coincident with that of a reference signal phase. Means are provided to control the amplitude of a delayed video signal from the charge-coupled device. In the embodiment of the invention described herein, the charge from the final stage of the charge-coupled device is converted into an electric signal by means of a converter that is divided into a plurality of parts of which the coupling areas differ from each other, thus forming video signals with levels differing from each other. By mixing these amplitude-controlled video signals, the system of the invention controls mixing and keying between video signals.

The above and other objects, features and advantages of the invention will become more apparent from the following detailed description of a preferred embodiment of the invention when read with reference to the accompanying drawings, wherein.

Figure 1:
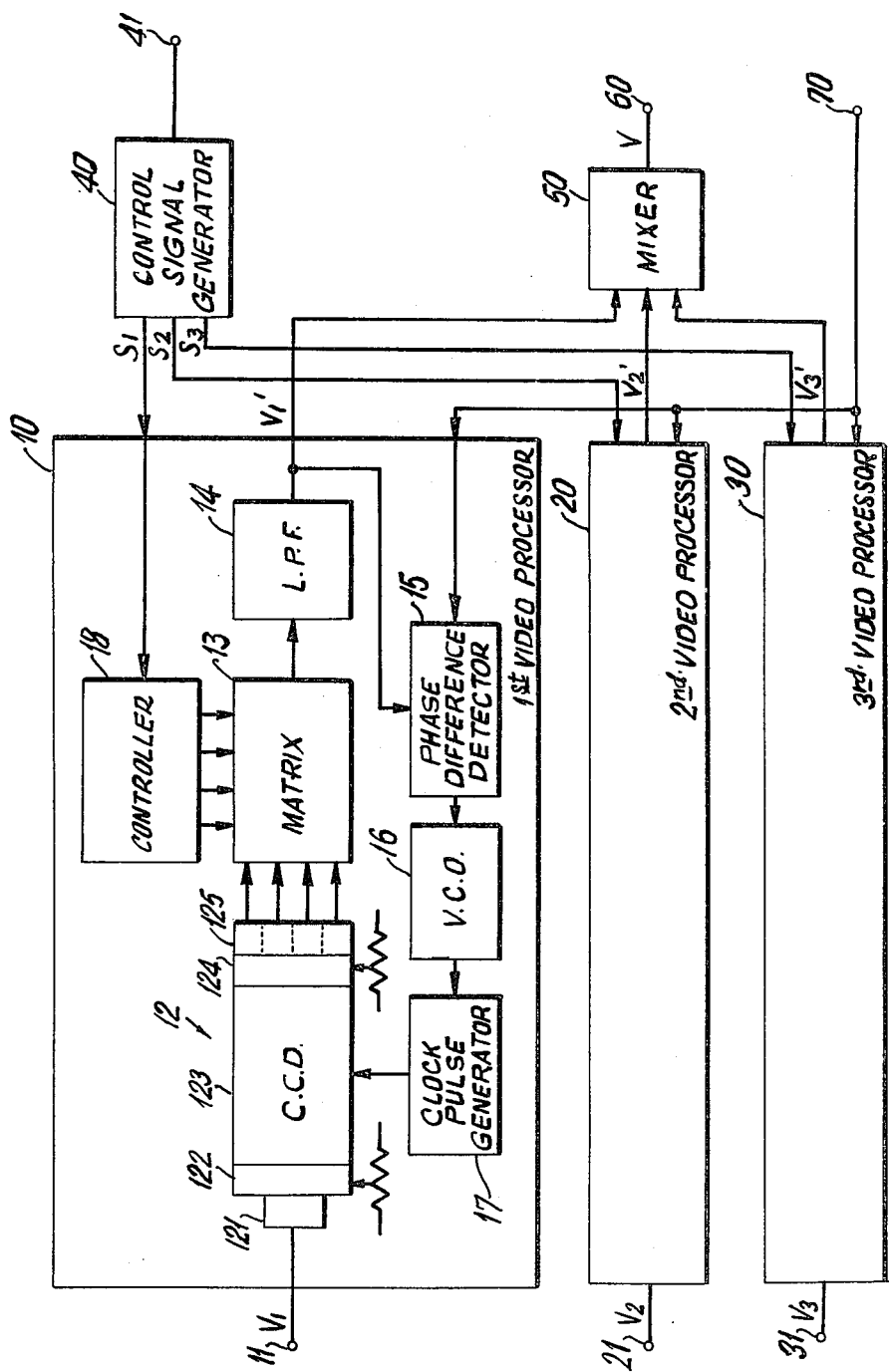
FIG. 1 is a block diagram showing a video mixing-/keying system according to one embodiment of the invention.

The embodiment of the invention illustrated in FIG. 1, which is capable of mixing/keying between three input video signals comprises first, second and third video signal processors 10, 20 and 30 for processing first, second and third video signals $V_1$, $V_2$ and $V_3$ respectively. The video signal processors 10, 20 and 30 are of the same construction as illustrated typically for the processor 10. Control signal generator 40 having a terminal 41 generates control signals to control the processing of video signals of the video signal processors 10, 20 and 30, and a mixer 50 connected to the outputs of the video signal processors mixes the video signals $V_1'$, $V_2'$, and $V_3'$, from the video signal processors 10, 20 and 30. Mixer 50 includes an output terminal 60, and the system also includes an input terminal 70 for providing a reference signal.

Video signal processor 10 comprises an input terminal 11 where the video signal $V_1$ is received and a charge-coupled device (CCD) 12. A matrix circuit 13 in which signals with amplitudes controlled by control signals are formed from a plurality of amplitude-varied video signals provided from the charge-coupled device 12 is connected to the output of device 12. A low-pass filter (LPF) 14 is connected to the output of matrix circuit 13 and a phase difference detector 15 for generating a phase difference signal having a voltage corresponding to the phase difference between the video signal $V_1'$ from the low-pass filter 14 and the reference signal from the reference signal input terminal 70 is connected to the output of filter 14 and receives the reference signal from input terminal 70. A voltage-controlled oscillator (VCO) 16 of which the oscillation frequency is controlled by the phase difference signal is connected to the output of detector 15 and a clock pulse generator 17 for generating a clock pulse for driving charge transfer on the charge-coupled device 12 is connected to the output of oscillator 16. A controller 18 provides input signals to matrix circuit 13 for controlling the matrix circuit 13 according to a control signal $S_1$ for the video signal $V_1$ received from the control signal generator 40.

The video signal $V_1$ is applied through the input terminal 11 to an input diode 121 of the charge-coupled device 12, and a charge corresponding to the input video signal $V_1$ is injected into a charge-coupled area 123 by an input control voltage applied to an input gate electrode 122. The injected charge is driven by a clock pulse received from the clock pulse generator 17 and is thereby transferred in the charge-coupled area 123 toward the right, as viewed in the drawing. The time required for the charge to be transferred, i.e., the delay time by the charge-coupled device, is proportional to the number $n$ of charge-coupled elements 123$a$, 123$b$, ....., 123$m$ and 123$n$ (FIG.2) comprised in the charge-coupled area 123 and is inversely proportional to the frequency of the clock pulse. The charge transferred to the last charge-coupled element 123$n$ is sent to an electric signal converter 125 by an output control voltage applied to an output gate electrode 124 whereby the transferred charge is converted into the corresponding electric signal.

Figure 2:
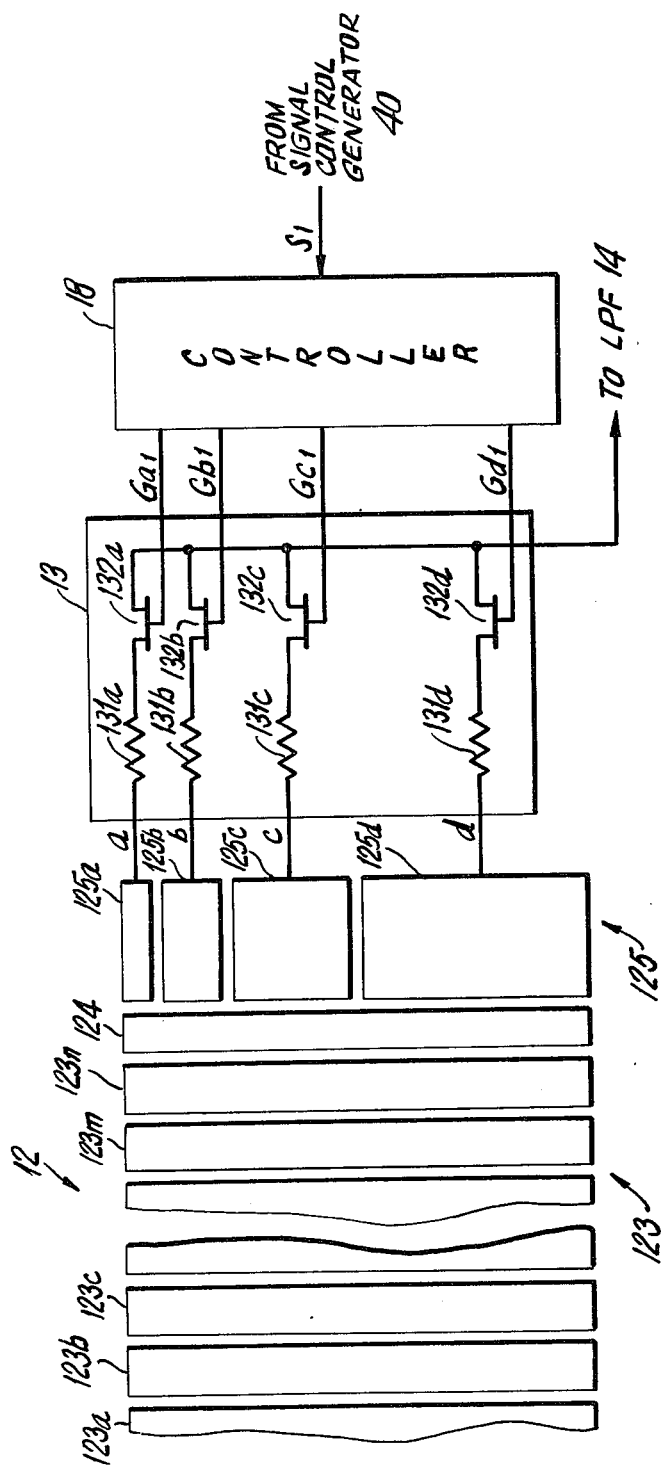
FIG. 2 is a schematic diagram partially in block form showing in greater detail a portion of the system illustrated in FIG. 1.

The electric signal converter 125 as illustrated in greater detail in FIG. 2, consists essentially of four elements 125$a$, 125$b$, 125$c$ and 125$d$ which have their geometric dimensions or widths respectively determined in the ratio of 1:2:4:8. In this ratio, the charge in the charge-coupled area 123 is divided and converted into electric signals. In other words, the amplitude ratio of signals $a$, $b$, $c$ and $d$ from the converter elements 125$a$, 125$b$, 125$c$ and 125$d$, respectively is 1:2:4:8. The signals *a*, *b*, *c* and *d* are the same except for their amplitudes. These signals are applied to field effect transistors (FET's) 132*a*, 132*b*, 132*c* and 132*d* through resistors 131*a*, 131*b*, 131*c* and 131*d*, respectively, of the matrix circuit 13. Because the resistors 131*a* to 131*d* are of the same value, the signals applied to the transistors 132*a* to 132*d* are in the amplitude ratio of 1:2:4:8. The gate electrodes of the FET's 132*a* to 132*d* are respectively supplied with binary gate control signals $Ga_1$, $Gb_1$, $Gc_1$ and $Gd_1$ from the controller 18 to control the switching operations of the FET's according to the control signal $S_1$ received from the control signal generator 40. The signals from the FET's, which are turned on by a gate control signal of logic 1, are mixed and applied to the low-pass filter 14, which, in turn, generates an output video signal $V_1'$ whose amplitude corresponds to the control signal $S_1$.

The video signal $V_1'$ is supplied to one input of the mixer 50, as well as to the phase difference detector 15 where the phase of the signal $V_1'$ is compared with that of a reference signal obtained from the reference signal input terminal 70. When the input video signal is a color television signal, a subcarrier signal is used as the reference signal. The burst signal is derived from the video signal $V_1'$, and the phase difference between the burst signal and the reference subcarrier signal is detected. The detected phase difference signal is applied to the voltage control oscillator 16 to control the oscillation frequency. The output signal of the oscillator 16 is applied to the clock pulse generator 17 and is there converted into a clock pulse which drives charge transfer on the charge-coupled area 123 of the charge-coupled device 12. As previously described, the time required for charge transfer, i.e., the delay time by the charge-coupled device, is inversely proportional to the frequency of the clock pulse. Hence the delay time can be varied by varying the frequency of the clock pulse. In other words, the phase of the video signal $V_1'$ can be made concident with that of the reference signal.

In the same manner as described above, the video signals $V_2$ and $V_3$ applied to input terminals 21 and 31, respectively, are automatically phase-controlled by the corresponding video signal processors 20 and 30 and are thus phase-synchronized with the reference signal and at the same time are amplitude-controlled by the control signals $S_2$ and $S_3$ supplied from the control signal generator 40. The resultant outputs of the video signal processors 20 and 30 are video signals $V_2'$ and $V_3'$ which are applied to the other inputs of mixer 50.

Figure 3A:
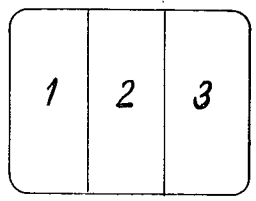
FIGS. 3 and 4 are waveform diagrams of signals appearing at various parts of the system.
Figure 3B:
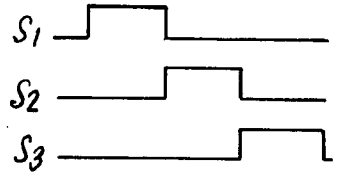
Figure 3C:
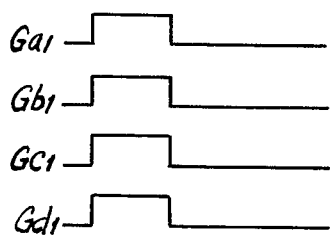
Figure 3D:
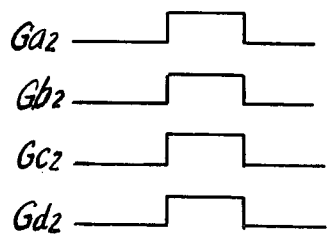
Figure 3E:
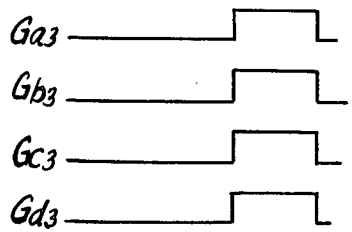
Figure 4A:
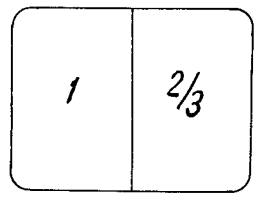
Figure 4B:
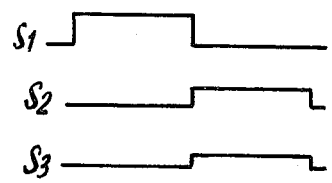
Figure 4C:
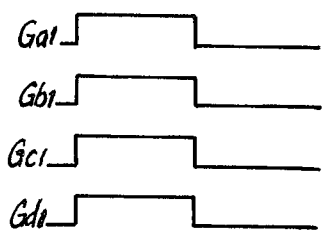
Figure 4D:
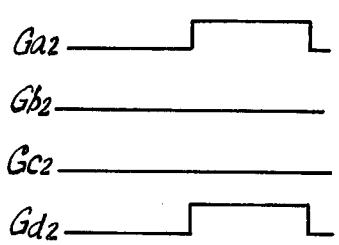
Figure 4E:
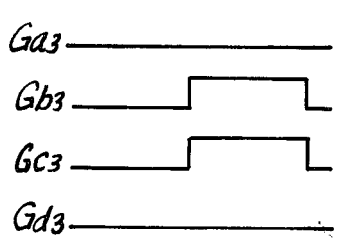

The video signals $V_1'$, $V_2'$ and $V_3'$ from the video signal processors 10, 20 and 30 are mixed in the mixer 50, and the mixed signal is made available at the output terminal 60. This output video signal V can be displayed on the television picture tube as shown in FIG. 3(A) wherein the three input video signals are keyed according to the control signals $S_1$, $S_2$ and $S_3$, into a first image (left), a second image (center) and a third image (right), or as shown in FIG. 4(A) wherein the three input video signals are keyed and mixed into a first image (left half), and a second and a third image (right half).

The operation of the system of the invention is now described in more detail by referring to FIGS. 3 and 4. FIG. 3 illustrates the operation for first, second and third images displayed by keying. For the period for which the first image is displayed, i.e., the first one-third of each horizontal scanning period, the amplitude of the control signal $S_1$ is set to 100%, and the other control signals are set to 0% as shown in FIG. 3(B). In response to the control signal $S_1$ of 100% amplitude, the controller 18 generates the gate control signals $Ga_1$ to $Gd_1$ of logic "1" as in FIG. 3(C), causing all the FET's 132*a* to 132*d* of the matrix circuit 13 to turn on. As a result, four signals from the electric signal converter elements 125*a* to 125*d* are mixed and applied to the low-pass filter 14 whereby the amplitude of the video signal $V_1'$ is controlled to a given value. However, since the control signals $S_2$ and $S_3$ stand at 0% amplitude, the gate control signals $Ga_2$ to $Gd_2$, and $Ga_3$ to $Gd_3$ as in FIGS. 3(D) and 3(E) at the second and third video signal processors 20 and 30 assume a logic level of 0, whereby the video signals $V_2'$ and $V_3'$ are not obtained. Thus the output of the mixer 50 is only the video signal $V_1'$, with the result that only the first image is displayed for the first one-third of each horizontal scanning period. For the second one-third period, i.e., the central one-third of the each horizontal scanning period, the amplitude of the control signal $S_2$ is set to 100%, and the amplitudes of the other control signals $S_1$ and $S_3$ are set to 0% as in FIG. 3(B). Then the gate control signals $Ga_2$ to $Gd_2$ as in FIG. 3(D) assume a logic level of 1, and all the other gate control signals assume a logic level of 0, whereby only the video signal $V_2'$ is obtained for display for the central one-third of each horizontal scanning period. For the last one-third of each horizontal scanning period, the amplitude of the control signal $S_3$ is set to 100%, and the amplitudes of the other control signals $S_1$ and $S_2$ are set to 0% as in FIG. 3(B). The gate control signals $Ga_3$ to $Gd_3$ as in FIG. 3(E) assume a logic level of 1 and the other gate control signals assume 0, whereby only the video signal $V_3'$ is obtained. In other words, only the third image is displayed for the last one-third of each horizontal scanning period. Thus an image as in FIG. 3(A) is viewed on the television tube as a result of keying between three video signals.

FIG. 4 illustrates the operation to obtain an image (A) by keying and mixing. As shown in FIG. 4(B), for the first half of each horizontal scanning period, the amplitude of the control signal $S_1$ is set to 100%, and the amplitudes of the other control signals $S_2$ and $S_3$ are set to 0%. For the latter half of each horizontal scanning period, the amplitude of the control signal $S_1$ is set to 0%, and the amplitudes of the control signals $S_2$ and $S_3$ are set to percentages in the mixing ratio, for example, to 60% (9/15) and 40% (6/15) respectively. The operation for the first half of each horizontal scanning period is the same as that for the first one-third period as described with reference to FIG. 3. For the latter half of the period, the amplitude of the control signal $S_1$ is at 0% and hence all the gate control singals $Ga_1$ to $Gd_1$ assume a logic level of 0 as in FIG. 4(C) where no video signal $V_1'$ is obtained. Because the amplitude of the control signal $S_2$ is at 60%, the gate control signals $Ga_2$ and $Gd_2$ assume a logic level of 1, and gate control signals $Gb_2$ and $Gc_2$ assume a logic level of 0 as in FIG. 4(D). In the video signal processor 20, therefore, only the transistors which receive the gate control signals $Ga_2$ and $Gd_2$ turn on, and the amplitude of the video signal $V_2'$ is at a controlled ratio of 60%. Then, because the amplitude of the control signal $S_3$ is at 40%, the gate control signals $Ga_3$ and $Gd_3$ assume a logic level of 0, and gate control signals $Gb_3$ and $Gc_3$ assume a logic level of 1. Thus, in the video signal processor 30, only the transistors which receive the gate control signals $Gb_3$ and $Gc_3$ turn on, and the video signal $V_3'$ of 40% amplitude is obtained. The video signals $V_2'$ and $V_3'$ are mixed by the mixer 50 whereby the second and third video signals mixed in a ratio of 3:2 are obtained.

In the embodiment of the invention described herein, an image from the mixture of the second and third video signals (except for the first video signal) may be displayed on the entire screen when the amplitude of the control signal $S_1$ is set to 0% for the whole of each horizontal scanning period, and the ratio of the two amplitudes of $S_2$ and $S_3$ is chosen to satisfy the ratio of the mixing of control signals the second and third video signals. This is an example wherein the image displayed is from mixing only two video signals. It is apparent that three video signals may be mixed for image display in a similar manner. When the video signal mixing ratio is varied with time, fade-in and fade-out operation is made available.

In keying between video signals, the amplitude of one of two control signals is gradually decreased from 100% in the boundary between the two images, and the amplitude of the other control signal is gradually increased from 0%. By this operation, a picture in which the boundary between the two images is dull can be obtained on the screen.

In the foregoing embodiment, a means for controlling the amplitude of a video signal from the charge-coupled element is used wherein the coupling areas of the electric signal converter element of the charge-coupled device are varied. Instead, the coupling areas may be kept the same but the resistance values of the resistors associated with the matrix circuit may be varied to vary the amplitudes of the signals at the outputs of the individual resistors. Or the amplitudes of the signals may be varied not by varying the resistance values of the matrix resistors but by the combination of the on and off states of the switching transistors.

An operation wherein a subcarrier signal is used as the external reference signal has been described. Instead, a black burst signal comprising a synchronizing signal and a burst signal may be used as the external reference signal. In such case, the phase of the synchronizing signal of the output signal of the charge-coupled element is compared with that of the synchronizing signal of the external reference signal. In like manner, the phase of the burst signal of the output signal of the charge-coupled element may be also compared with that of the external reference signal. When the phase difference between the two synchronizing signals is large, the voltage control oscillator is controlled by the phase difference signal derived from such synchronizing signals. In contrast, when the phase difference between the two synchronizing signals becomes relatively small, the oscillator is controlled by the phase difference signal derived from the two burst signals. Further, means for obtaining the phase difference signals may be designed so that the gain of the amplifier causing the phase difference signal of the latter is made larger than that of the former. By this arrangement, the signal phases can be made coincident with each other even if the phase difference between two input video signals is relatively large.

What is claimed is:

1. A video mixing and/or keying system in which a plurality of video signals are mixed and/or keyed, said system comprising:
    a plurality of signal processors for respectively producing a corresponding plurality of controlled video signals from said plurality of video signals,
    a source of control signals, and
    means for mixing said controlled video signals from said signal processors,
    said signal processors each including a charge-coupled device for delaying one of said video signals in response to a driving pulse; means for producing a phase difference signal representative of the phase difference between said delayed video signal and a reference signal, the frequency of said driving pulse being controlled by said phase difference signal; and means including means for converting the charge transferred in said charge-coupled device for controlling the amplitude of said delayed video signal in response to an assigned one of said control signals.

2. The video mixing and/or keying system as claimed in claim 1, wherein said plurality of converting means have coupling area differing from each other in geometric dimension.

3. The video mixing and/or keying system as claimed in claim 2, wherein said controlling means includes a plurality of switching means respectively connected to said coupling areas each of which receives a switch control signal according to said assigned one of said control signals.

4. The video mixing and/or keying system as claimed in claim 3, wherein said controlling means further includes means for operatively combining the outputs of said plurality of switching means, said combined outputs constituting said controlled video signal.

5. The video mixing and/or keying system as claimed in claim 1, further comprising means connected to said plurality of signal processors for operatively combining said plurality of controlled video signals.

* * * * *